United States Patent
Belrose et al.

(10) Patent No.: US 9,049,597 B2
(45) Date of Patent: Jun. 2, 2015

(54) TELECOMMUNICATIONS DEVICE SECURITY

(75) Inventors: Caroline Belrose, Marlborough (GB); Nicholas Bone, Thatcham (GB)

(73) Assignee: VODAFONE GROUP PLC, Newbury, Berkshire (GB)

( * ) Notice: Subject to any disclaimer, the term of this patent is extended or adjusted under 35 U.S.C. 154(b) by 1064 days.

(21) Appl. No.: 12/675,944

(22) PCT Filed: Aug. 29, 2008

(86) PCT No.: PCT/GB2008/050750
§ 371 (c)(1),
(2), (4) Date: Sep. 17, 2010

(87) PCT Pub. No.: WO2009/027743
PCT Pub. Date: Mar. 5, 2009

(65) Prior Publication Data
US 2011/0003580 A1    Jan. 6, 2011

(30) Foreign Application Priority Data

Aug. 31, 2007   (GB) .................................. 0716828.9

(51) Int. Cl.
*H04M 1/66* (2006.01)
*H04W 12/08* (2009.01)
*G06F 21/34* (2013.01)
*G06F 21/53* (2013.01)
*G06F 21/62* (2013.01)
*G06F 21/77* (2013.01)
*G06F 21/85* (2013.01)

(52) U.S. Cl.
CPC ............... *H04W 12/08* (2013.01); *G06F 21/34* (2013.01); *G06F 21/53* (2013.01); *G06F 21/6209* (2013.01); *G06F 21/77* (2013.01); *G06F 21/85* (2013.01); *G06F 2221/2149* (2013.01)

(58) Field of Classification Search
USPC .................................................. 455/410, 558
See application file for complete search history.

(56) References Cited

U.S. PATENT DOCUMENTS 5,841,869 A    11/1998   Merkling et al.
6,216,014 B1    4/2001   Proust et al.
(Continued)

FOREIGN PATENT DOCUMENTS

WO      WO 02/076126      9/2002
WO      WO-03/003170      1/2003
WO      WO 2006/010371    2/2006

OTHER PUBLICATIONS

International Search Report for PCT/GB2008/050750.
(Continued)

*Primary Examiner* — Marisol Figueroa
(74) *Attorney, Agent, or Firm* — B. Aaron Schulman, Esq.; Nicholas Trenkle; Stites & Harbison, PLLC

(57) ABSTRACT

A terminal (1) for use with a cellular or mobile telecommunications network (3) includes authentication means (15) such as a SIM, USIM, UICC etc. for authenticating the terminal with the network. The terminal further includes a normal execution environment (30) and a secure execution environment (34). An interface controller (46) is provided in the secure execution environment and intercepts all communications directed to the authentication means to control access to the authentication means by these communications.

44 Claims, 2 Drawing Sheets

(56) References Cited

U.S. PATENT DOCUMENTS

Figure 1:
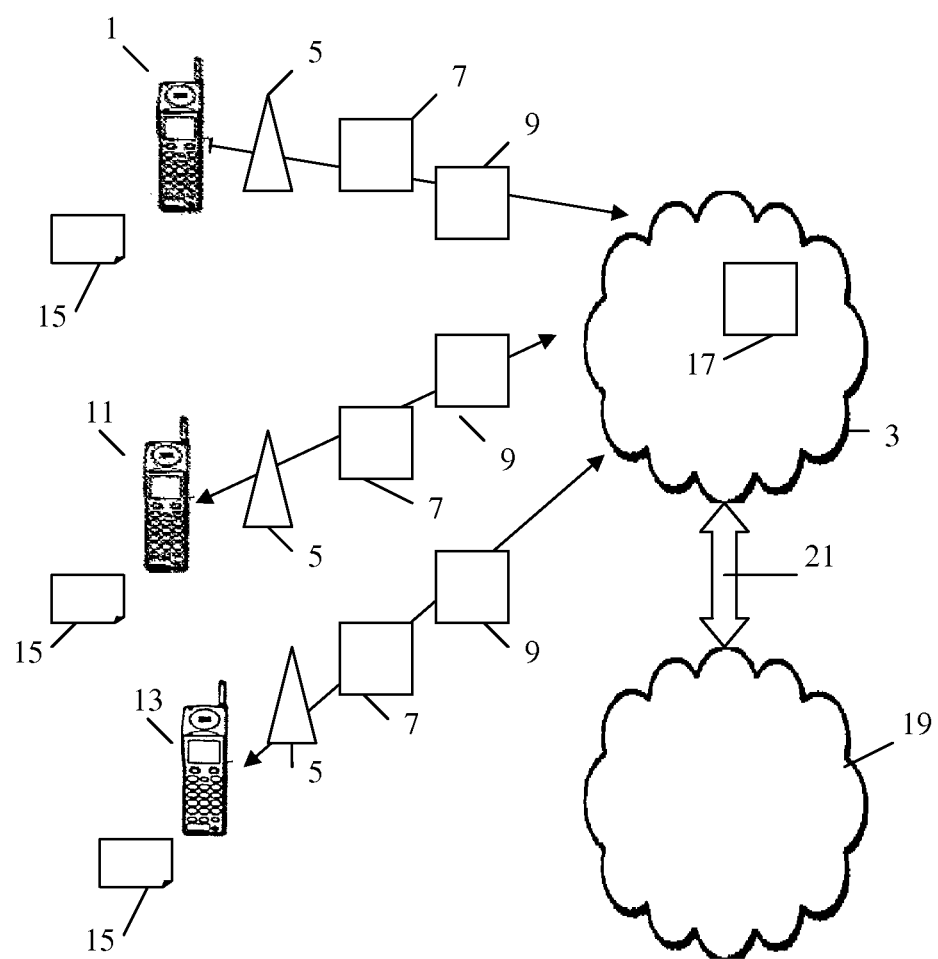

| | | | | |
|---|---|---|---|---|
| 7,047,405 B2* | 5/2006 | Mauro | | 713/166 |
| 7,286,852 B2 | 10/2007 | Imura et al. | | |
| 2003/0046567 A1* | 3/2003 | Carman | | 713/193 |
| 2003/0069886 A1* | 4/2003 | Jaskiewicz | | 707/10 |
| 2006/0099991 A1* | 5/2006 | Bajikar et al. | | 455/558 |

OTHER PUBLICATIONS

OMA:. "Smartcard Web Server Enabler Architecture" [Online] (Feb. 9, 2007), XP002496672 Retrieved from the Internet: URL:http://www.openmobilealliance.org/technical/release_program/docs/SCWS/V1_0-20071 002-C/OMA-AD-Smartcard_Web_Server-V1_0-200 70209-C.pdf>; [retrieved on Jan. 13, 2009].

3GPP: "3rd Generation Partnership Project;Technical Specification Group Services and System Aspects; Recommendations for Trusted Open Platforms(Release 7)" 3GPP Draft; TR33905-200-CL, 3rd Generation Partnership Project (3GPP), Mobile Competence Centre ; 650, Route Des Lucioles ; F-06921 Sophia-Antipolis Cedex, France, vol. tsg_sa\WG3_Security\TSGS3_46_Beijing\Output, no. Beijing; 20070213, (Feb. 16, 2007), XP050279776.

Motre S: "Formal Model and Implementation of the Java Card Dynamic Security Policy", TECHNICAL REPORT SM-99-09, XX, XX, (Jul. 1, 1999), p. COMPLETE13.

OMTP: "Application Security Framework"[Online], (02-0-2007), XP002508332 Retrieved from the Internet: URL:http://members.omtp.org/Lists/ReqPublications/Attachments/38/0MTP_Application_Se_curity_Framework_v2_0.pdf>, [retrieved on Jan. 13, 2009].

Evgenia Pisko Ed—Anonymous: "Mobile Electronic Signatures: Progression from Mobile Service to Mobile Application Unit" Management of Mobile Business, 2007. ICMB 2007. International Conferen Ce on the, IEEE, PI, (Jul. 1, 2007), pp. 6-6.

TCG: "Mobile Reference Architecture"[Online], (Jun. 12, 2007), XP002508333 Retrieved from the Internet: URL:https://www.trustedcomputinggroup.org/specs/mobilephone/tcg-mobile-reference-arc hitecture-1.0.pdf>,[retrieved on Jan. 13, 2009].

European Search Report Dated Jan. 14, 2008 in corresponding UK Application No. GB0716828.9.

* cited by examiner

TELECOMMUNICATIONS DEVICE SECURITY

The present invention relates to a terminal for use with a cellular or mobile telecommunications network, the terminal including authentication means for authenticating the terminal with the network. The present invention also relates to a method of protecting data on the authentication means.

The SIM functions were historically not exposed outside of the closed environment of the GSM/UMTS radio unit/terminal. However newer (U)SIMs and UICCs (Universal Integrated Circuit Cards) are capable of providing a far wider range of (possibly security sensitive) services to terminal applications. These services could be network related (e.g. providing authentication material and cryptographic keys for network access) or they could be generic security services (such as secure storage or provisioning of data) which make use of the security features of a UICC. Due to these additional features that are available on UICCs, there has been an increase in the number of terminal applications requiring access to the UICC.

Certain of the UICC access commands are particularly sensitive and access to these commands should be restricted. Examples of such commands include:

Access to network connect authentication data and key material which could:
  allow a rogue application access to network ciphering keys
  allow a rogue application to impersonate the (U)SIM to the network
  allow a rogue application to impersonate the network to the (U)SIM
Access to GBA (Generic Bootstrapping Architecture) keys which are used to authenticate the terminal or a terminal application to a network application server. This could allow a rogue application could impersonate another application to such a network server.
Access to sensitive application data stored on the UICC. This could allow a rogue application access to the sensitive application data of another application In addition, access to the UICC could allow a rogue application to launch a denial of service attack on the UICC.

In most terminal implementations access to these sensitive UICC commands is controlled in some way. However as modern mobile terminal operating systems become larger, more complex, and more prone to security bugs, and as we see an increased utilisation of UICC capabilities, the risk of unauthorised access to sensitive SIM functions and data is inevitably increased.

A secure channel has previously been proposed to protect communications between the SIM and the terminal, and is being standardised through 3GPP SA3 33.110 and ETSI SCP 102.484. A general-purpose secure channel may be set up between the UICC and terminal, or secure channels may be set up between applications on either side as required.

If a general-purpose secure channel is established, then this ensures that only an authorised device is able to access the UICC via the secure channel, and if sensitive UICC access commands require this channel, then this does offer some protection against unauthorised access to these UICC commands. However, without adequate protection of the secure channel end point on the terminal side, there is no guarantee of protection against a rogue application within the authorised device from accessing sensitive UICC functions.

If an application-to-application secure channel is established, then theoretically only the application end points can access the secure channel. However this relies on the application end points being able adequately to protect their authentication data and keys used to maintain the secure channel. If these are accessible by a rogue application on the device, then this rogue application could potentially also have access to the secure channel or could impersonate the authorised application to the UICC.

Therefore the existence of a secure channel does not necessarily guarantee adequate fine-grained protection against unauthorised access to sensitive UICC functions.

The technical report 3GPP TR 33.905 issued by 3GPP (http://www.3gpp.org/ftp/Specs/html-info/33905.htm) makes recommendations to protect the SIM Application Programming Interfaces (APIs) (in particular those relating to GBA) within the terminal. The 3GPP recommendations advocate the use of a server function which acts as a gateway to the UICC card for controlling access to certain specific UICC functions, namely GBA, I-WLAN and credential access.

The Open Mobile Terminal Platform (OMTP) Application Security Framework v2.0 (http://www.omtp.org/approved.html) document describes recommendations for how to manage application access to terminal Application Programming Interfaces (APIs). In this framework, applications are associated with a level of trust depending whether or not they are certified, and if they are certified, by whom. Applications certified by operators or manufacturers are the most trusted, and unsigned applications are the least trusted.

The Application Security Framework (ASF) is described in OMTP Application Security Framework v2.0, available from: http://www.omtp.org/approved.html>. ASF identifies sets of potentially dangerous APIs and defines the set of APIs that may be accessed by applications at each trust level. For APIs that are accessible at a particular trust level, a user prompting regime is also proposed to ensure that dangerous APIs are not used without the user's awareness and permission.

However, the OMTP ASF describes how to restrict access to terminal functionality and is not geared towards protection of the UICC functions.

In one aspect, the present invention provides a terminal for use with a cellular or mobile telecommunications network, the terminal including at least one trusted component for providing trusted services, a normal execution environment and a trusted area, wherein the terminal further includes an interface controller, provided in the trusted area, operable to intercept all communications directed to the or each trusted component and further operable to control access to the or each trusted component by the said communications.

The interface controller may also be operable to control access to trusted services provided by the or each trusted component.

The trusted area itself may also provide at least one trusted service. Where this holds, the interface controller may be operable to intercept all communications directed to the at least one trusted service provided in the trusted area and further operable to control access to the trusted services provided in the trusted area. The interface controller may then be operable to redirect communications requesting access to at least one trusted service on the or each trusted component to the trusted service provided in the trusted area.

Alternatively or additionally, the interface controller may be operable to redirect communications requesting access to trusted services provided in the trusted area to a trusted service on said at least one trusted component.

Advantageously, said at least one trusted service provided in the trusted area may be functionally equivalent to at least one of the trusted services of the or each trusted component.

In these circumstances, communications requesting access to said at least one trusted service on the or each trusted component may be redirected to the functionally equivalent trusted service provided in the terminal, and vice versa.

It is noted that while a service may be requested it may not actually be provided in the trusted component or trusted area to which a request has first been directed. In such cases, it is advantageous to allow the redirection of the request to a functionally equivalent trusted service that is present on another trusted component or trusted area.

Furthermore, the interface controller may be operable to redirect requests from one trusted service to a functionally equivalent trusted service on the same trusted component, or indeed from one trusted service in the trusted area to a functionally equivalent trusted service that is also provided in that same trusted area.

Where more than one trusted component is present the interface controller may then be operable to redirect requests from one trusted component to another trusted component. Likewise, where more than one trusted area is present the interface controller may then be operable to redirect requests for a trusted service in one trusted area to a trusted service in another trusted area.

The trusted services may include authenticating the terminal with the network. Additionally or alternatively, the trusted services may include storage of sensitive data.

Preferably, the trusted area may be a secure execution environment of the terminal.

The interface controller may be implemented in software, which is preferably run in a secure execution environment, or may be implemented in hardware.

There may be a plurality of normal execution environments, a plurality of trusted areas/secure execution environments and/or a plurality of trusted components. The interface controller may control access to any one of the trusted components (and trusted services provided by the trusted components) and may also control access to trusted components/services available through any one of the trusted areas/secure execution environments.

The trusted component may comprise authentication means, such as a smart card, SIM, USIM or UICC, and may operate in accordance with the GSM and/or 3G Standards. In one embodiment the interface controller is a trusted secure UICC gateway that filters all communications to the UICC. The trusted component may be a separate in-built security chip, and a secure channel may be established to protect the data bus between the interface controller and the trusted component.

Also, in the embodiment, the main operating system of the terminal is provided in the normal execution environment. The operating system provides a gateway to the interface controller/trusted secure UICC gateway. The operating system is operable to pass communications towards the interface controller/trusted secure UICC gateway.

The gateway provided by the operating system to the interface controller/trusted secure UICC gateway may be a "virtual" interface controller/UICC gateway which passes a request to the interface controller/trusted secure UICC gateway. The virtual interface controller/UICC gateway in the embodiment is provided in the normal execution environment of the mobile terminal, which is less secure than the trusted area/secure execution environment. Any application requesting data from the interface controller/trusted secure UICC gateway in the embodiment requests this information via the operating system and virtual interface controller/UICC gateway. The requesting application may therefore not be aware of the environment in which the interface controller/trusted secure UICC gateway resides.

The interface controller may be "transparent" to the communications, so that the sender of the communications believes that they are received directly by the trusted component/authentication means/UICC.

The interface controller may control all access to the trusted component/authentication means (if present) where access may originate from an application in any terminal execution environment All execution environments may have a virtual interface or gateway through which communication attempts with the trusted component/authentication means are passed to the actual interface controller in a secure environment in such a way that the calling application need not know the location of the interface controller or the trusted component/authentication means being called.

The interface controller may impose access control functions on all communications to the trusted component/authentication means and can restrict or filter communications to the trusted component/authentication means If certain functionality (e.g. secure storage) of the trusted component/authentication means is available in the terminal (or on a different component), then the interface controller may interchange this functionality of the trusted component/authentication means with the trusted functionality of the terminal/alternate component depending on availability. This may be transparent to calling applications.

The interface controller in the trusted area/secure execution environment may control all access to a trusted service where access may originate from an application in any terminal execution environment.

All other execution environments may have a virtual interface or gateway through which communication attempts with a trusted service are passed to the actual interface controller in the trusted area/secure execution environment in such a way that the calling application need not know the location of the interface controller or the trusted service being called.

The interface controller may impose access control functions on communications to a trusted service and can restrict or filter communications to the service.

A trusted service may be provided by the UICC (e.g. trusted functionality or secure/authenticated storage).

The trusted service could be provided by a function in a secure execution environment on the terminal or another trusted component.

If the trusted service is implemented on a removable component, then the interface controller may advantageously establish a secure channel to the trusted service or component hosting the trusted service. However, trusted components can also be implemented as separate in-built or embedded security chips and it may also be advantageous to establish a secure channel to protect the data bus between the interface controller and that in-built class of trusted component.

The interface controller may interchange functionally equivalent trusted services (i.e. may route communications to any equivalent trusted service) if functionally equivalent trusted services exist, and dependent on availability. This may be transparent to calling applications.

The present invention also provides a method of controlling access to a trusted component as defined in claim 23 onwards.

Figure 2:
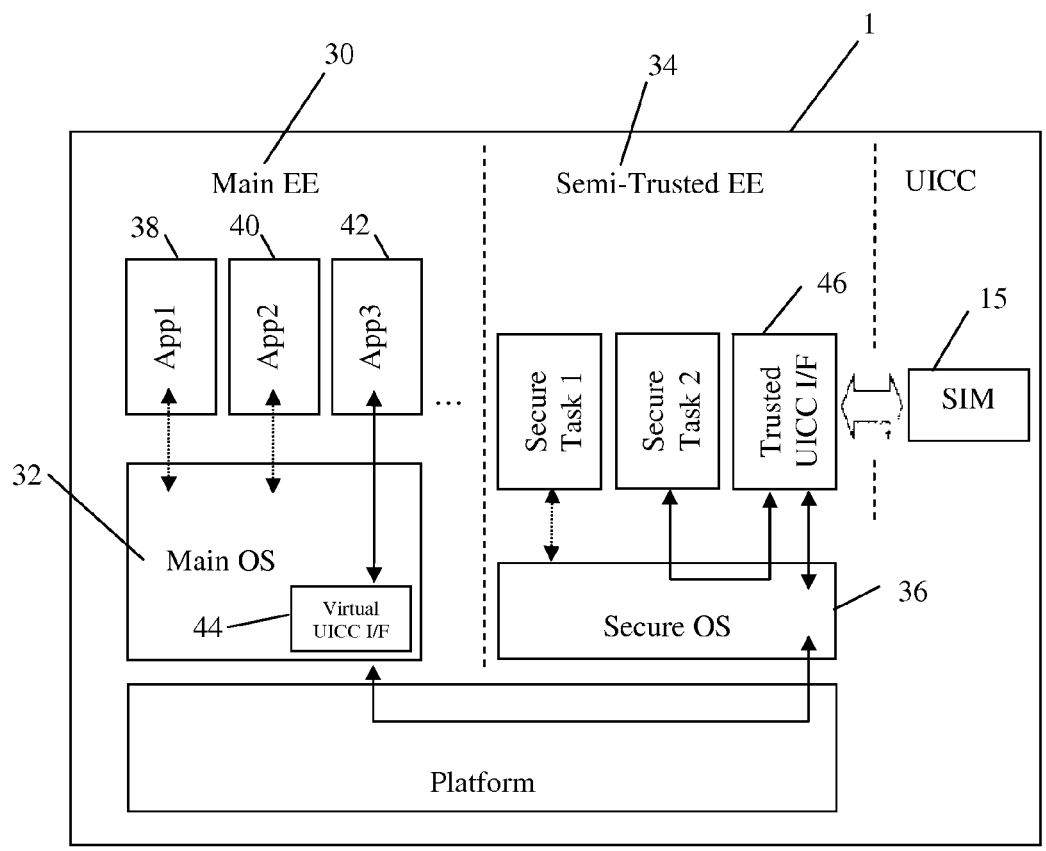

For a better understanding of the present invention, an embodiment will now be described, by way of example only, with reference to the accompanying drawings, in which:

FIG. 1 shows schematically the elements of a telecommunications network including mobile telecommunication terminals; and FIG. 2 shows schematically some elements present in one of the telecommunications terminals of FIG. 1, in accordance with the embodiment of the invention.

The elements of a conventional mobile or cellular telecommunications network will first be briefly described with reference to FIG. 1.

FIG. 1 shows schematically a network in which the invention may be used. The figure shows a cellular network. However, it should be appreciated that the invention is applicable to any type of network, although it is particularly applicable to a network where at least some of the devices communicate using mobile telecommunications/wireless data transmission.

A first telecommunications terminal 1 is registered with a GSM/GPRS or UMTS (3G) mobile telecommunications network 3. The telecommunications terminal 1 may be a handheld mobile telephone, a personal digital assistant (PDA) or a laptop computer equipped with a datacard. The telecommunications terminal 1 communicates wirelessly with mobile telecommunications network 3 via the radio access network (RAN) of the mobile telecommunications network 3, comprising, in the case of a UMTS network, a base station (Node B) 5, and a radio network controller (RNC) 7. Communications between the telecommunications terminal 1 and the mobile telecommunications network 3 are routed from the radio access network via GPRS support nodes (SGSN) 9, which may be connected by a fixed (cable) link to the mobile telecommunications network 3.

In a conventional manner, a multiplicity of other telecommunications terminals are registered with the mobile telecommunications network 3. These telecommunications terminals include second and third telecommunications terminals 11, 13. The second and third telecommunications terminals 11, 13 communicate with the mobile telecommunications network 3 in a similar manner to the telecommunications terminal 1, that is via an appropriate Node B 5, RNC 7 and SGSN 9.

The mobile telecommunications network 3 includes a gateway GPRS support node (GGSN) 17 which enables IP-based communications with other networks, such as the Internet or other IP network 19 via an appropriate link 21.

Each of the telecommunications terminals 1, 11 and 13 is provided with a respective subscriber identity module (or UICC) 15. The UICC 15 is a trusted component (trusted by the mobile telecommunications network 3) and provides trusted services. During the manufacturing process of each UICC, authentication information is stored on the UICC under the control of the mobile telecommunications network 3. The mobile telecommunications network 3 itself stores details of each of the UICCs issued under its control. In operation of the mobile telecommunications network 3, each of the telecommunications terminals 1, 11, 13 is authenticated (for example, when the user activates the telecommunications terminal in the network with a view to making or receiving calls) by the network sending a challenge to the telecommunications terminal 1,11,13 incorporating a UICC 15, in response to which the UICC 15 calculates a reply (dependent on the predetermined information held on the UICC—typically an authentication algorithm and a unique key Ki) and transmits it back to the mobile telecommunications network 3. The mobile telecommunications network 3 includes an authentication processor 17 which generates the challenge and which receives the reply from the telecommunications terminal 1, 11, 13.

Using pre-stored information identifying the relevant UICC 15, the authentication processor calculates the expected value of the reply from the telecommunications terminal 1, 11, 13. If the reply received matches the expected calculated reply, the UICC 15 and the associated telecommunications terminal are considered to be authenticated.

It should be understood that such an authentication process can be performed for any telecommunications terminal provided with a UICC 15 under control of the mobile telecommunications network 3. In the embodiment each telecommunications terminal 1,11,13 communicates wirelessly with the mobile telecommunications network 3 via the network's radio access network, although this is not essential. For example, the telecommunications terminal may communicate with the network via the fixed telephone network (PSTN), via a UMA "access point" and/or via the Internet.

The UICC 15 used by each telecommunications terminal 1,11,13 may be a UICC of the type defined in the GSM or UMTS standards specifications, or may be a simulation of a UICC—that is, software or hardware that performs a function corresponding to that of the UICC.

As shown in FIG. 2, the mobile terminal 1 includes a main Execution Environment (EE) 30, including a main operating system (OS) 32, similar to that found on a conventional mobile terminal. The mobile terminal 1 further includes a trusted area—in the embodiment a secure or semi-trusted Execution Environment 34 in which a secure operating system 36 is implemented.

An application 38,40,42 wishing to access the UICC 15 requests this access from the main OS 32 or execution environment (EE) 30 in which it is operating. The OS/EE 32/30 provides a UICC interface gateway for applications above it.

If the OS/EE 32/30 is highly trusted by the issuer of the UICC, then this gateway may have direct access to the UICC 15; otherwise this gateway is a virtual UICC gateway 44, which passes the request to trusted secure UICC gateway 46 that does have direct UICC access.

The trusted secure UICC gateway 46 (which has direct UICC 15 access) resides in the secure EE 34 on the terminal 1, and other (virtual) gateways 44 reside in non-secure or less secure areas (e.g. 30). These virtual gateways 44 are provided so that applications need not know in which environment the actual UICC gateway 46 resides.

The virtual UICC access gateways 44 may perform some initial filtering of UICC access requests (e.g. the main OS 32 may determine that the application does not have sufficient privileges to access the UICC 15), but the ultimate access control is governed by the trusted UICC gateway 46. Since this gateway 46 is securely implemented, there is little chance that these controls may be bypassed.

If a secure channel to the UICC 15 is required, then the trusted UICC gateway 46 negotiates a secure channel with the UICC 15 and since all UICC 15 access passes through the trusted UICC gateway 46, all communications would be secured. Since the trusted UICC gateway 46 is securely implemented, the sensitive credentials and key material on the UICC necessary for secure channel setup and maintenance are well protected.

The trusted secure UICC gateway 46 provides a single trusted control point in the terminal 1 for access to the UICC 15 functions. This control point 46 filters all communications to the UICC 15 and imposes any policy restrictions required.

The trusted secure UICC gateway 46 may be a hardware or software component on the terminal that:
  filters ALL communications to the UICC 15
  maintains an access control policy to UICC 15 functions acts as a security gateway to the UICC 15 and enforces the UICC 15 access control policy restricts the allowed commands (only allow certain functional requests, not fine-grained access to the UICC 15)

establishes a secure communications channel with the UICC 15 if the UICC is removable or the channel is insecure is protected from attack and prevents the bypass of control The security policy maintained by the trusted secure UICC gateway 46 takes into consideration the trustworthiness or trust level or an application requiring access (e.g. whether it is a signed application or whether it is privileged in the ASF of the operating system) and the UICC access required.

The security policy maintained by the trusted secure UICC gateway 46 could therefore be seen as an ASF for UICC functions, and the policy need not be restricted to only "access granted" or "access denied" but may also include the option to prompt the user at runtime for access control decisions as is the case in the OMTP ASF for terminal functions.

For example, an untrusted application may not be granted access to highly sensitive UICC functions such as network authentication commands but may be granted access to moderately sensitive UICC functions subject to user prompting.

The trusted secure UICC gateway 46 may also provide an interface to applications on the terminal 1 even if the functional services are not provided by the UICC 15 but are provided by other trusted services within the terminal (such as secure storage facility, an Mobile Trusted Module (MTM), or even a software UICC/SIM), and this would be hidden from the application.

For example, an application may wish to securely store some data, and sends the instruction SecurelyStore (X) to the trusted secure UICC gateway 46. The trusted secure UICC gateway 46 may then store data object X with a secure storage facility on the terminal 1, or may transmit X via a secure channel to the UICC 15 for storage, depending on what facilities are available.

A software trusted secure UICC gateway 46 should be implemented in a trusted area of the terminal 1 such as a secure execution environment 34 where it is less vulnerable to attack. In addition, a software trusted secure UICC gateway 46 may be protected by mechanisms such as a secure boot process. This reduces the risk of bypassing or disabling the trusted secure UICC gateway 46. It also provides added security for secure channels which may be established with the UICC 15 and the storage and manipulation of associated keys.

Having a single end point for the secure channel being specified in ETSI SCP offers a simpler terminal architecture. The trusted secure UICC gateway 46 may then offer applications access to "virtual" secure channels which would use the general-purpose secure channel to protect against external attacks but where different virtual or logical channels would be managed in a trusted way by the trusted secure UICC gateway 46 to protect against internal attacks.

The access commands providing access to sensitive UICC functions and data are protected by residing in a trusted area 34 of the terminal 1. Such an architecture provides better control over the access to the UICC 15, and therefore better control over the UICC's assets.

The invention claimed is:

1. A terminal for use with a cellular or mobile telecommunications network, the terminal comprising:

a trusted component implemented to perform functionality for providing one or more trusted services that each enable access to one or more capabilities according to a corresponding service interface for the trusted service, a terminal platform upon which a normal execution environment and a trusted area are implemented, and an interface controller implemented within the trusted area and communicatively connected to the trusted component via a communications channel, the interface controller operating to intercept all communications being sent to the trusted component requesting access to any of the one or more trusted services according to the corresponding service interfaces and to restrict access to the trusted component for each intercepted communication.

2. The terminal of claim 1, wherein the interface controller is operable to control access to each trusted service provided by the trusted component.

3. The terminal of claim 1, wherein the trusted area also provides at least one trusted service.

4. The terminal of claim 3, wherein the interface controller is also operable to intercept all communications directed to the at least one trusted service provided in the trusted area and further operable to control access to each trusted service provided in the trusted area.

5. The terminal of claim 3, wherein the interface controller is operable to redirect communications requesting access to at least one trusted service provided by the trusted component to a corresponding trusted service provided in the trusted area.

6. The terminal of claim 1, wherein the interface controller is operable to redirect communications requesting access to the at least one trusted service provided in the trusted area to a corresponding trusted service provided by the trusted component.

7. The terminal of claim 3, wherein said at least one trusted service provided in the trusted area is functionally equivalent to at least one of the trusted services provided by the trusted component.

8. The terminal of claim 1, wherein the one or more trusted services include performing an authentication of the terminal with the network.

9. The terminal of claim 1, wherein the one or more trusted services include storage of sensitive data.

10. The terminal of claim 1, wherein the trusted area is a secure execution environment implemented on the terminal platform.

11. The terminal of claim 1, wherein a main operating system of the terminal is provided in the normal execution environment.

12. The terminal of claim 11, wherein the operating system provides a gateway to the interface controller.

13. The terminal of claim 12, wherein the operating system is operable to pass communications towards the interface controller.

14. The terminal of claim 12, wherein the gateway is implemented as a virtual interface controller operable to pass communications requesting access to any of the one or more trusted services to the interface controller in the trusted area such that requests for accessing any of the one or more trusted services handled by the interface controller appear to be handled by the gateway.

15. The terminal of claim 14, wherein the virtual interface controller executes in the normal execution environment.

16. The terminal of claim 1, wherein the trusted component is selected from a SIM, a USIM, and a UICC.

17. The terminal of claim 1, wherein the interface controller is operable to establish a secure channel to the one or more trusted services and to route each intercepted communication that is authorized for at least one of the one or more trusted services from the trusted area to each trusted service for which the communication is authorized via the secure channel.

18. The terminal of claim 1, wherein the interface controller is operable to establish a secure channel to the trusted component and to route each intercepted communication that is authorized for at least one of the one or more trusted services from the trusted area to the trusted component via the secure channel.

19. The terminal of claim 1, wherein the interface controller is operable to filter access to the trusted component for each intercepted communication.

20. The terminal of claim 1, wherein the trusted component is removable.

21. The terminal of claim 1, wherein the interface controller is operable to intercept said communications from any one of a plurality of execution environments implemented on the terminal platform.

22. The terminal of claim 1, wherein the interface controller is operable to intercept said communications from any one of a plurality of applications.

23. A method of controlling access in a mobile terminal for use with a cellular or mobile telecommunications network, the method including:
providing a trusted component in the mobile terminal that is implemented to perform functionality to provide one or more trusted services that each enable access to one or more capabilities according to a corresponding service interface for the trusted service;
implementing an interface controller within a trusted area that is implemented on a terminal platform of the terminal upon which a normal execution environment is implemented;
communicatively connecting the interface controller to the trusted component via a communications channel such that the interface controller operates to intercept all communications being sent to the trusted component requesting access to any of the one or more trusted services according to the corresponding service interfaces; and
restricting access to the trusted component for each intercepted communication.

24. The method of claim 23, further including controlling access to each trusted service provided by the trusted component for each intercepted communication.

25. The method of claim 23, further including providing at least one trusted service in the trusted area.

26. The method of claim 25, further including intercepting all communications directed to the at least one trusted service provided in the trusted area and controlling access to each trusted service provided in the trusted area.

27. The method of claim 25, further including redirecting communications requesting access to at least one trusted service provided by the trusted component to a corresponding trusted service provided in the trusted area.

28. The method of claim 23, further including redirecting communications requesting access to the at least one trusted service provided in the trusted area to a corresponding trusted service provided by the trusted component.

29. The method of claim 25, wherein said at least one trusted service provided in the trusted area is functionally equivalent to at least one of the trusted services provided by the trusted component.

30. The method of claim 23, wherein the one or more trusted services include performing an authentication of the terminal with the network.

31. The method of claim 23, wherein the one or more trusted services include storage of sensitive data.

32. The method of claim 23, wherein the trusted area is a secure execution environment implemented on the terminal platform.

33. The method of claim 23, wherein a main operating system of the terminal is provided in the normal execution environment.

34. The method of claim 33, further including providing, in the operating system, a gateway to the interface controller.

35. The method of claim 34, further including passing communications towards the interface controller via the gateway.

36. The method of claim 33, wherein the gateway is a virtual interface controller that simulates the interface controller and passes communications requesting access to any of the one or more trusted services to the interface controller in the trusted area such that requests for accessing any of the one or more trusted services handled by the interface controller appear to be handled by the gateway.

37. The method of claim 36, wherein the virtual interface controller executes in the normal execution environment.

38. The method of claim 23, wherein the trusted component is selected from a SIM, a USIM, and a UICC.

39. The method of claim 23, further including establishing a secure channel to the one or more trusted services via the interface controller, and routing each intercepted communication that is authorized for at least one of the one or more trusted services from the trusted area to each trusted service for which the communication is authorized via the secure channel.

40. The method of claim 23, further including establishing a secure channel to the trusted component via the interface controller, and routing each intercepted communication that is authorized for at least one of the one or more trusted services from the trusted area to the trusted component via the secure channel.

41. The method of claim 23, further including filtering access to the trusted component for each intercepted communication.

42. The method of claim 23, wherein the trusted component is removable.

43. The method of claim 23, further including intercepting said communications from any one of a plurality of execution environments implemented on the terminal platform.

44. The method of claim 23, further including intercepting said communications from any one of a plurality of applications.

* * * * *